April 18, 1967  D. W. LERCH  3,314,184
METHOD AND APPARATUS FOR TRANSFERRING FISH BY PUMPING
Original Filed Sept. 8, 1964  2 Sheets-Sheet 1

INVENTOR.
DAVID W. LERCH
BY
Christensen, Sanborn & Matthews
ATTORNEYS

April 18, 1967     D. W. LERCH     3,314,184

METHOD AND APPARATUS FOR TRANSFERRING FISH BY PUMPING

Original Filed Sept. 8, 1964     2 Sheets-Sheet 2

INVENTOR.
DAVID W. LERCH
BY Christensen, Sanborn & Matthews
ATTORNEYS

United States Patent Office 3,314,184
Patented Apr. 18, 1967

3,314,184
METHOD AND APPARATUS FOR TRANSFERRING FISH BY PUMPING
David W. Lerch, Iquique, Chile (% Marine Construction & Design Co., 2300 W. Commodore Way, Seattle, Wash. 98199)
Continuation of application Ser. No. 394,681, Sept. 8, 1964. This application Sept. 16, 1966, Ser. No. 580,055
10 Claims. (Cl. 43—4.5)

ABSTRACT OF THE DISCLOSURE

Fish concentrated in a body of water are transmitted under positive pressure through a conduit to a point of discharge by means of a fish and water mixture pump unit having its outlet connected to the conduit and adapted to be operated physically submersed, with its inlet opening directly into the surrounding water. Flexibility of the conduit and of energizing lines for the pump unit's drive motor permits raising, lowering and otherwise maneuvering the pump unit suspended from a fishing vessel in any required sequence of relative manipulations of the pump unit and fish net or other concentrating means in order to maintain the concentration of fish at the pump's inlet. The flexible conduit may be made flexibly collapsible throughout its length for compact storage and the pump unit housed in a unitary encapsulation structure including a hydraulic motor physically adjoining and drivingly connected to the pump.

This application is a continuation of Ser. No. 394,681 filed Sept. 8, 1964, entitled, Apparatus for Pumping of Fish, and now abandoned.

The present invention relates to an improved method and apparatus for pumping first from a net, boat hold or other place where they are concentrated in water submersion. The invention is herein illustratively described in its preferred mode of application to bailing from a net into a fishing vessel hold; however, it will be recognized that certain modifications and changes therein and certain variations in the specific practice thereof may be employed without departing from the essential features involved.

The traditional practice for many years in transferring captured fish from a purse seine or similar net to a fishing vessel has been the brailer. This basket-like scoop is lowered into the net, lifted through the mass of fish therein, swung inboard and then emptied onto the deck or into the hold. The procedure is time-consuming and laborious, often dangerous. Further, it requires some means to hold the net open for passage of the brailer. Such a means may comprise a boom or outriggers or, more commonly, a small seine skiff standing off from the fishing vessel. In foul weather the skiff often bangs against the side of the vessel creating a serious hazard. Moreover, in order to use a brail effectively, the net must be "dried-up," that is it must be gathered in sufficiently to compress the fish into a very small space, and with large catches this creates extreme loads in the mesh, sometimes resulting in serious losses of fish and in gear damage.

In an effort to avoid the problems just mentioned, suction pumps have been installed on fishing vessel for drawing the fish up from the net through a suction hose for discharge into the hold. The method has proved to be workable and is in use on a number of vessels. Being large, the suction pump is usually mounted out on the main deck or in the main engine room. The pump may comprise any of several commercially available types and makes. It is generally a centrifugal pump with a rounded one or two-vane impeller capable of passing solids without damage.

Besides its large size, hence immobility and space consumption, the typical suction pump used in those installations has the disadvantage of having to be constantly primed. This requires auxiliary apparatus such as a separate centrifugal pump introducing priming water into the suction hose so as to provide a positive head on the pump inlet at all times. Because the priming head is left in continuous operation during unloading of the net, the water fed into the suction line by the primer pump reduces the useful capacity of the main pump to pump fish. In another priming arrangement an air chamber in the suction line above the pump is connected to a vacuum eductor, commonly of the Bernouli type, to draw a partial vacuum in the chamber. Such a system usually entails use of an auxiliary pump to produce a heavy stream of water through the eductor so as to create the required vacuum pressure. This arrangement, though more complex than a direct primer pump, has the advantage of maintaining a prime without introducing additional water into the line. The method necessitates some means, such as a check valve or trap, to prevent water from backing up through the pump from the discharge side thereof, and thus permitting air to enter the system. Only the larger vessels can conveniently accommodate such systems. Moreover, once so equipped, a vessel is not readily or conveniently converted to other types of fishing as is increasingly becoming the practice.

A further problem encountered with former suction pump brailing systems lies in the requirement that the fish transfer conduit withstand high negative pressure without collapsing. To serve the purpose, these hoses are very stiff and heavy, even when empty, and become heavier, of course, when full. Moreover, even a carefully constructed hose and its connections on the suction side of the system develop air leaks, reducing the efficiency of the pump by entrainment of air bubbles in the pump stream. Moreover, because of physical limitations of suction pumping systems the method previously practiced required that the drying of the catch be more or less completed before starting to pump. With a heavy catch the method was slow, subject to occasional interruption by loss of pump prime, and did nothing to relieve net strain and at times net failure due to overstressing the mesh in raising the catch.

Still another disadvantage of conventional suction pumping systems lies in the great change of pressure which the fish undergo in being moved from the net to the vessel. While in the net, the fish are under a positive head of pressure, which may vary from a few feet to 10 or 15 feet. Upon being drawn into the suction hose, the fish undergo progressively decreasing pressure, down to as low as minus 20 feet of head at the pump inlet. Then, in the fraction of a second while the fish pass from the pump inlet to its outlet, the pressure jumps to a high positive value of approximately 30 to 40 feet of head. These extreme and sudden changes of pressure tend to rupture the fish and diminish their market value.

A broad object of this invention is to provide a pump brailing system and apparatus which overcomes the above described and similar difficulties with previous systems. A further object is to so simplify the construction and handling and to so reduce the apparatus bulk, weight and cost requirements for pump brailing as to permit its effective and economic use on small vessels as well as large, and to make this possible without appreciable modifications of existing vessels, and without necessity for additions thereto of costly power sources, rigging or other equipment. A specific object in this vein is to provide such a pump brailing system which may be handled and energized using rigging and power sources customarily already available on most fishing vessels.

A specific object is to provide a fish transfer system which overcomes the previous problem of fish damage due to sudden excessive changes of pressure.

A further specific object is to provide an improved pump brailing system which overcomes the necessity for pump priming.

Still another specific object is to provide such a pump brailing system in which the transfer conduit need not be designed against collapsing under suction pressure as heretofore but may even be of a collapsible type if desired, and may also be subject to leakage without impairment of system efficiency.

Still another object is to achieve greater efficiency in brailing pump operation and to permit use of a smaller pump, with lower power requirements than heretofore, for the same quantity of fish and water being pumped.

As herein disclosed the improved pump brailing system utilizes a submersible pump unit which is actually lowered down into the net to a suitable depth for operation on the end of a fish transfer conduit, which is a pressure conduit and not a suction conduit and which leads upwardly and over the side of the vessel for discharging the fish into the hold. Suitable supporting means and energizing connections for the pump unit permit it to be operated in its submerged position so to draw fish from the confinement of the net directly into the pump inlet, with the pump inlet being inherently self primed by the fact that it is under the prevailing positive head of pressure determined by the water depth at which the pump unit is operated. Functioning as a pressure conduit rather than a suction conduit the hose is not required to be sufficiently stiff and heavy to resist pressure collapse; consequently it may be relatively flexible and light in weight so as to be handled easily with conventional rigging and may be stowed conveniently when not in use. Moreover, by operating in submerged position the pump is required to do less work than a deck-mounted suction pump, so that the pump itself may be smaller and will consume less power to do the same useful work than in the case of a deck-mounted suction pump brailer. Moreover, fish initially under positive pressure in the water surrounding the pump remain under positive pressure in passing through the pump, such pressure increasing during the passage and then dropping off gradually to atmospheric still positive pressure as the fish move upwardly in the conduit and are discharged into the vessel.

With the improved method and apparatus, pumping may be started early in the procedure of drawing in the net, even though the fish are then still in the bottom of the net at relatively great depth. As a result the net can be brought in more quickly and with less chance of overstressing the mesh even in the case of a very large catch. Moreover, when the pumping is completed, raising of the pump out of the water results in a downward surge of water through the conduit and out of the pump so as to flush the same clean and prevent rotting of fish in the periods between hauls.

These and other features, objects and advantages of the invention will become more fully evident from the following description thereof by reference to the accompanying drawings.

Figures 1, 4:
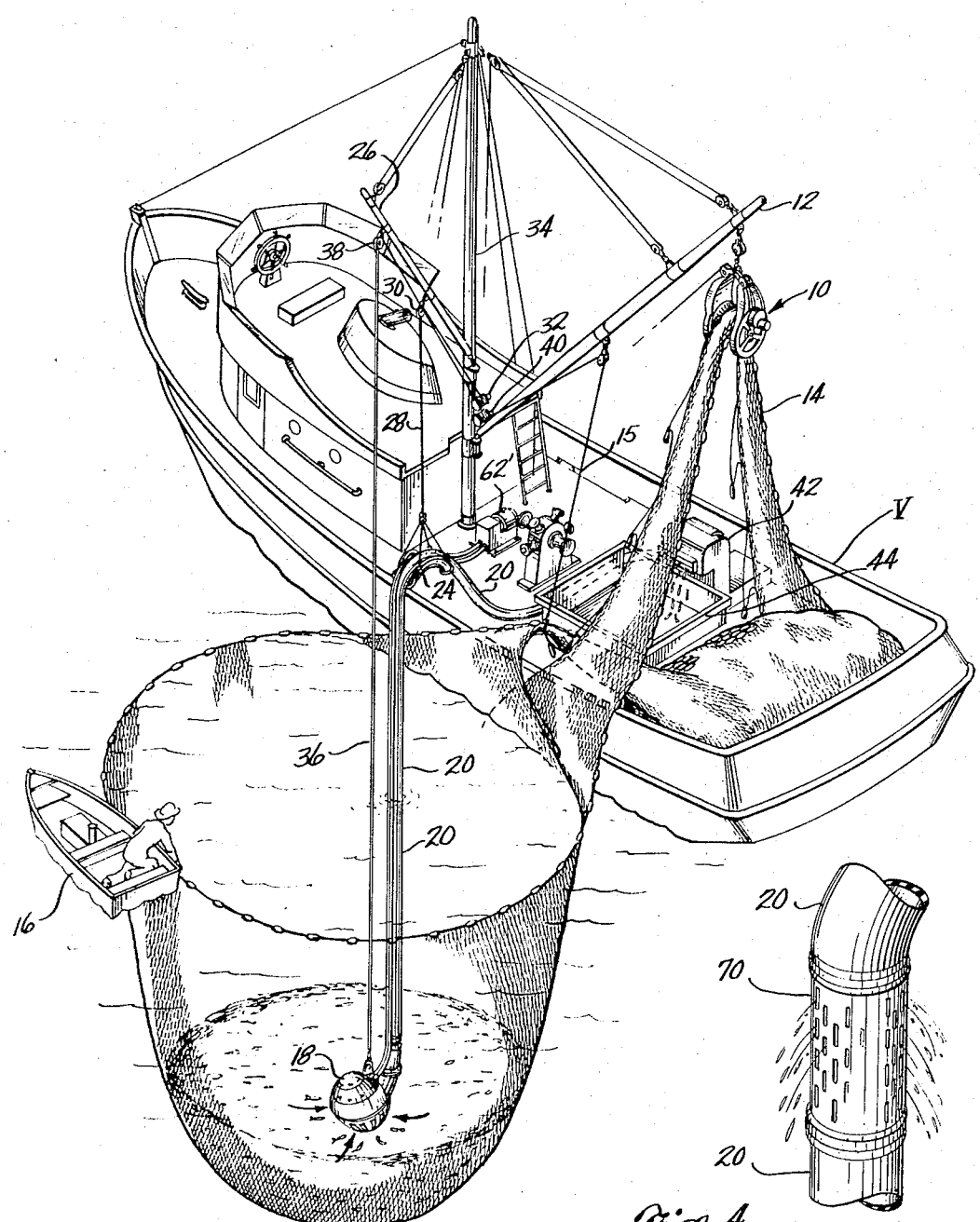
FIGURE 1 is an isometric view showing a fishing vessel upon which the invention in its preferred form is installed.
FIGURE 4 is an isometric view of a section of conduit incorporating means for partial dewatering of the stream of fish being transferred to the vessel.
Figure 2:
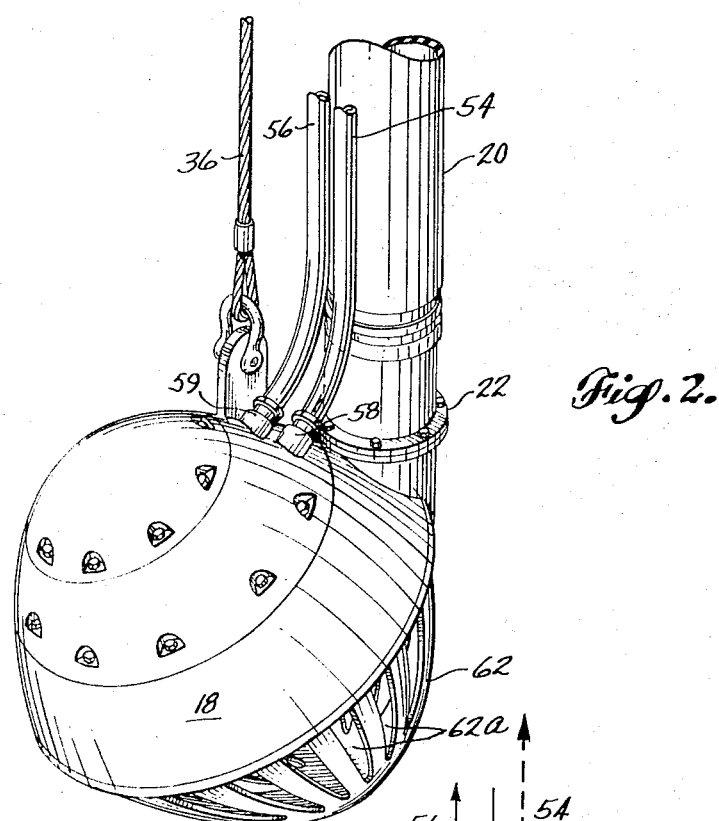
FIGURE 2 is an isometric view of the submersible pump unit and associated portions of connected rigging, hydraulic pressure and return lines and fish transfer conduit connected thereto.
Figure 3:
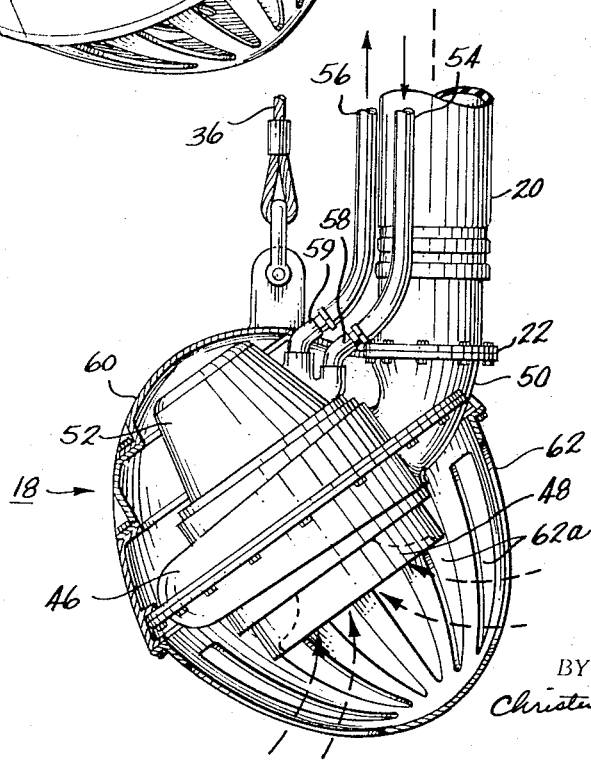
FIGURE 3 is a side view of the unit shown in FIGURE 2, with parts broken away to illustrate certain features.

Referring to FIGURE 1, fishing vessel V is shown equipped with suitable net-hauling means such as the power operated device 10. The unit 10 is mounted on the end of the boom 12 and is raised to an elevated position over the deck in order to haul in the purse seine net 14, as disclosed in United States Patents Nos. 2,733,530 and 2,733,531, Feb. 17, 1956, Mario J. Puretic. A skiff 16 may be used to control the float line so as to provide an adequate opening for initial lowering of the submersible pump unit 18 into the net. Once the unit is submerged in the net, there is no further need for keeping the net open at the surface during the transfer of the catch to the vessel. As will be evident, this invention may be employed with any other suitable apparatus or technique for handling of the net and with any other type of net or other device for confining the fish to be transferred in a water medium.

Submersible pump unit 18 is mounted at the lower end of a pressure conduit or hose 20 to which its volute or discharge side is connected through a suitable coupling 22. The conduit 20 extends upwardly from the net and over the side of the vessel, usually being suspended on a curved saddle 24 from an auxiliary boom 26. To this end, a line 28 carrying the saddle 24 extends upwardly and over a sheave 30 mounted on the boom 26, thence to a winch 32 on the mast 34. A separate line 36 carries the submersible pump 18 and associated connected elements for raising and lowering the pump unit and for positioning and shifting the same about in the net. The line 36 extends upwardly and over a sheave 38 on the boom 26, thence to a winch 40 on the mast 34. The winches 32 and 40 may be operated in conjunction with each other, or independently, as necessary in order to raise and lower their respective loads in coordinated manner during operation of the system. The net is progressively strapped or dried up alongside the vessel as the brailing progresses using suitable means such as the strapping line 15 in order to compress the fish into a sufficiently small space within the net that the submersible pump unit 18 will reach them all with a minmium amount of manipulation. In this regard the extent to which the fish need be compacted or "dried" with use of this invention is much less than with conventional brailing practices using a basket or scoop, or the former suction pump system which could not be readily employed to reach effectively into the net to any substantial depth so as to permit pumping early in the drying operation.

Transfer hose 20 may be of any suitable construction, including heavy canvas, fabric reinforced rubber, reinforced plastic, or any other practicable construction which will permit it to withstand the conditions of use. It need not be reinforced against collapse as in the case of a suction hose, however, and is not required to be free of leaks or perforations. Hose 20 leads to a suitable point of discharge for the water and fish being pumped upwardly through it from the net by the submersible pump unit 18. In the illustration the hose is connected to the inlet side of a dewatering device 42, preferably of the type disclosed in commonly assigned copending patent application Ser. No. 419,480 filed by Peter Schmidt, Jr., on Dec. 18, 1964. This dewatering device is mounted at one side of the vessel between the rail and the hatch 44 and discharges the dewatered fish directly into the hold while the water separated from the fish is dumped overboard.

In its illustrated form the submersible pump unit includes a centrifugal-type pump such as one of the type normally used as a sludge pump in sewage systems. There are various commercially available pumps of this type capable of pumping solids without damage either to the pump impeller or to the solids involved. Such pumps usually comprise a centrifugal impeller having one or two rounded vanes. For example, a six inch pump of this type will pump a three inch diameter solid, whereas a ten inch pump will pump approximately a five or six inch diameter solid without damage. In the illustration the pump details have not been illustrated, since they may vary and are or may be conventional. For example, a pump volute-impeller design of the nature shown in Toft U.S. Patent 2,396,305 would also serve. The pump housing herein shown is indicated at 46 and is provided with a bell-shaped inlet 48, flaring outwardly and downwardly, and a discharge outlet 50 connected to the volute side of the pump and coupled as previously described to the pressure hose 20. Upon the upper side of the pump housing is mounted a hydraulic motor unit 52 connected to drive the pump impeller.

Hydraulic pressure and return lines 54 and 56 are connected to the respective fittings 58 and 59 so as to energize the hydraulic motor. These lines extend upwardly along with the conduit 20. In the illustration they pass over the saddle 24 and from there extend to the hydraulic pressure pump unit 62' mounted on the deck of the vessel where it can be driven by a suitable prime mover. Hydraulic pump units, such as the unit 62', are typically available on modern pulse seine fishing vessels for use in driving other loads such as the net-hauling apparatus 10. They have sufficient capacity and pressure to operate a centrifugal pump according to this invention, particularly since in most cases they are normally required to serve no other loads while the submersible pump unit 18 is being operated.

It will be recognized that the hydraulic motor is perhaps the ideal means for driving the submersible pump unit 18 in accordance with this invention, since it is typically small and light in weight for its power output capability and does not present the difficult sealing and electrical problems of a submerged electric motor. However, it will be recognized that other types of drive motors may be used if desired. It will also be evident that the particulars of the rigging and associated gear for raising, lowering and otherwise moving the submersible pump unit and associated energizing connections and conduit are not part of this invention and are subject to wide variation.

Submersible pump unit 18 should have an outer housing which presents a relatively unencumbered and smooth exterior surface free of sharp corners and of projecting bolts, nuts or edges which could catch in or damage a fish net. In the illustrated case the housing is approximately spherical. It comprises a multi-segment hemispherical dome portion 60 and complementally formed basin portion 62. The dome surrounds and encloses the hydraulic motor 52 and the upper portion of the centrifugal pump unit 46. The basin portion 62 extends over the bell-shaped inlet 48 of the centrifugal pump and serves as a screen or grid through which water and fish must pass in order to reach the inlet. The openings 62a in basin portion 62 are of a size which will pass the fish readily but which will exclude any objects or materials too large to pass safely and freely through the pump impeller. In this illustration the grid openings 62a taper in width from their upper or base ends, located adjacent to the joint between dome portion 60 and basin portion 62, toward their opposite ends located near the apex of the basin, which is aligned with the axis of the bell-shaped pump inlet 48. Such taper in the width of the opening 62a tends to compensate partially for the tendency of water entering the interior of the housing portion 62 to be drawn more rapidly in regions near the axis of the bell-shaped inlet 48 than it is at laterally offset side locations. The purpose of this compensation is to more or less equalize the velocity of flow through all open portions of the grid-basin. In the illustration the common axis of the hydraulic motor unit 52 and of the pump unit 46 with its axial inlet 48 is inclined to the vertical. This arrangement is deemed most satisfactory for the mounting and connection of the suspension cable 36, the hydraulic hoses 54 and 56 and the fish transfer conduit 20 to their associated pump unit fittings. However, it should be recognized that other physical arrangements, shapes and orientations of the pump unit components may be employed if desired.

Referring to FIGURE 4, a multiapertured sleeve 70 is inserted in the fish transfer pressure hose 20 as a section thereof. This sleeve accomplishes partial dewatering of the stream of fish and water flowing upwardly in the pressure hose toward the principal dewatering device 42. Preferably, dewatering sleeve 70 is located in the pressure conduit 20 at a point just ahead its upper bend carried by harness 24, such that the rising column of fish and water has nearly reached its summit and it is possible to permit some of the water to escape without creating undue friction in the hose to flow of the mass of fish through the remaining length of hose.

These and other aspects of the invention will be evident to those skilled in the art on the basis of the foregoing disclosure of the presently preferred application and method of use thereof.

I claim as my invention:

1. In fishing with nets and the like, the method of bailing fish concentrated by the net underwater utilizing a rotary impeller fish and water pump and a transfer conduit connected to the outlet of the pump to carry the discharge stream thereof, said method comprising positioning and operating the pump physically under water in the net where the fish are concentrated so as to draw fish with water directly into the pump's inlet for transmission in a stream under positive pressure through the conduit, and as the pumping progresses manipulating relatively the pump and the net so that the decreasing numbers of fish remaining in the net continue to be concentrated around the pump.

2. In a purse seining and the like the method of bailing the net of its catch from alongside a vessel utilizing a rotary impeller fish and water pump and an elongated conduit connected to the outlet of the pump to carry the discharge stream thereof, said method comprising bodily submerging and operating the pump beneath the water's surface within the net's confines and continuing to manipulate relatively the net and pump so as to draw in the net and accommodatively adjust the pump's relative position therein so as to maintain the pump in the concentration of fish as the bailing proceeds.

3. The method defined in claim 2 wherein the pump is lowered into the net to commence the bailing operation and is raised out of the water after completion of the bailing operation.

4. Portable means for transferring water-borne fish and the like from an underwater concentration thereof upwardly to a discharge location, comprising a flexible pressure conduit of an interior cross section to carry a stream of fish and water under pressure pumped therethrough, said conduit being disposable for directed discharge of fish at one end thereof, a portable submersible pump unit comprising housing means enclosing a rotary-impeller pressure pump including a motor for driving the pump impeller, means forming a pump inlet orifice which opens directly into the water and concentration of fish with the pump unit submerged therein, and means forming a pump outlet attached to the opposite end of said conduit, flexible energizing line means connected to the pump motor and extending therefrom to connect such motor to a remote energy source for energizing the motor with the pump unit submerged, and means supportingly connected to said pump unit and operable to maneuver the pump unit with conduit attached, for positioning the pump unit in the concentration of fish.

5. Apparatus for transferring fish in a water-borne concentration upwardly to a discharge location comprising an elongated flexible conduit of a diameter sufficient to carry a stream of fish and water, said conduit having an inlet end, a rotary impeller submersible fish and water pump including means adapting the same to be positioned and operated submerged in the concentration of fish, said pump having a discharge outlet connected to said inlet end of the conduit, having an inlet which opens directly into the concentration of fish with the pump so submerged and being operable thereby to pump a stream of fish and water under positive pressure upwardly through said conduit.

6. The apparatus defined in claim 5, wherein the conduit comprises a hose of such relatively thin wall flexible construction as to permit it to be collapsed for compact storage when not pressurized by the pumped stream of water and fish.

7. The apparatus defined in claim 5, wherein the pump is housed in a unitary structure and wherein the means adapting the pump to be positioned and operated submerged includes a hydraulic motor mounted in said structure physically adjoining and drivingly connected to the pump impeller, and further includes suspension means by which to physically suspend the pump movably in the concentration of fish.

8. The apparatus defined in claim 7, wherein the housing structure is smoothly contoured exteriorly so that it does not tend to catch in the mesh of a fish net, and wherein the pump has an outwardly flared inlet with a screen which covers the inlet and has screen openings of a size and shape to exclude fish too large to pass freely through the pump.

9. In a fishing vessel which incorporates a derrick or similar hoisting device, apparatus for transferring fish in a water-borne concentration thereof to a discharge location, said apparatus comprising an elongated flexible conduit of a diameter sufficient to carry a stream of fish and water, said conduit having an inlet end, a rotary impeller submersible fish and water pump including means adapting the same to be positioned suspended from said hoisting device and operated submerged in the concentration of fish, said pump having a discharge outlet connected to said inlet end of the conduit, having an inlet which opens directly into the concentration of fish with the pump so submerged and being operable thereby to pump a stream of fish and water under positive pressure upwardly through said conduit.

10. The combination of claim 9, wherein the vessel has a hydraulic pressure source and the means adapting the pump to be positioned and operated submerged includes a hydraulic motor physically adjoining and drivingly connected to the pump impeller, and elongated flexible hydraulic pressure hose means to connect the hydraulic motor of the fish and water pump operatively to the vessel's hydraulic pressure source.

References Cited by the Examiner

UNITED STATES PATENTS

| | | | |
|---|---|---|---|
| 1,361,691 | 12/1920 | Davis | 43—6.5 |
| 2,149,600 | 3/1939 | Guinard | 103—87 X |
| 2,396,305 | 3/1946 | Toft | 214—14 |
| 2,736,121 | 2/1956 | Kimmerle | 43—6.5 |
| 3,010,402 | 11/1961 | King | 103—103 |

SAMUEL KOREN, *Primary Examiner.*

WARNER H. CAMP, *Examiner.*